United States Patent [19]

Hsia et al.

[11] Patent Number: 4,798,515
[45] Date of Patent: Jan. 17, 1989

[54] VARIABLE NOZZLE AREA TURBINE VANE COOLING

[75] Inventors: Edward S. Hsia, Cincinnati; John H. Starkweather, West Chester; William K. Koffel, Cincinnati, all of Ohio

[73] Assignee: The United States of America as represented by the Secretary of the Air Force, Washington, D.C.

[21] Appl. No.: 895,016

[22] Filed: May 19, 1986

[51] Int. Cl.⁴ .............................. F04D 29/38
[52] U.S. Cl. .................... 415/115; 60/242; 415/160; 416/96 A
[58] Field of Search ........... 60/242, 253, 255, 39.16, 60/39.51; 415/115, 160; 416/90, 96 A

[56] References Cited

U.S. PATENT DOCUMENTS

| | | | |
|---|---|---|---|
| 3,540,810 | 11/1970 | Kercher | 416/90 |
| 3,628,880 | 12/1971 | Smuland et al. | 415/115 |
| 3,767,322 | 10/1973 | Durgin et al. | 416/97 |
| 4,105,364 | 8/1978 | Dodd | 416/96 A X |
| 4,135,362 | 1/1979 | Glenn | 60/39.16 R |
| 4,193,738 | 3/1980 | Landis, Jr. et al. | 415/115 |
| 4,221,114 | 9/1980 | Wilde et al. | 60/242 |
| 4,252,501 | 2/1981 | Peill | 415/115 |
| 4,312,624 | 1/1982 | Steinbauer, Jr. et al. | 415/115 |
| 4,403,917 | 9/1983 | Laffitte et al. | 416/96 A |
| 4,413,949 | 11/1983 | Scott | 416/96 A |
| 4,474,532 | 10/1984 | Pazder | 415/115 X |
| 4,592,508 | 6/1986 | Thornock | 60/242 X |
| 4,616,976 | 10/1986 | Lings et al. | 415/115 X |

FOREIGN PATENT DOCUMENTS 2017229 3/1979 United Kingdom ............... 415/115

Primary Examiner—Peter A. Nelson
Attorney, Agent, or Firm—Gerald B. Hollins; Donald J. Singer

[57] ABSTRACT

The cooling insert for a movable vane in a jet engine is divided into plural overlapping forward and aft segregated members, each member being coolant fed through separate vane trunnion areas and each insert is of successively decreasing cross-sectional area. Problems of locally inadequate vane cooling, coolant match point movement, and unequal coolant supply pressures are addressed by the disclosed apparatus. Reuse of the trunnion supplied impingement cooling air for additional cooling functions is also disclosed.

17 Claims, 4 Drawing Sheets

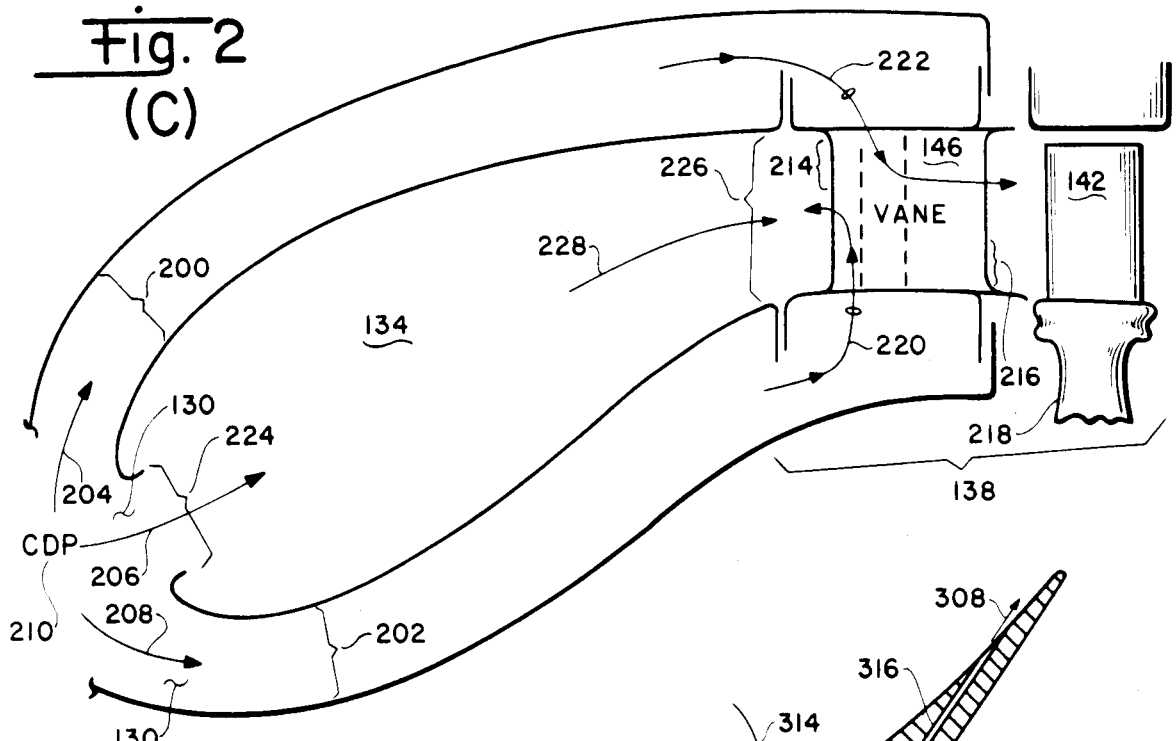
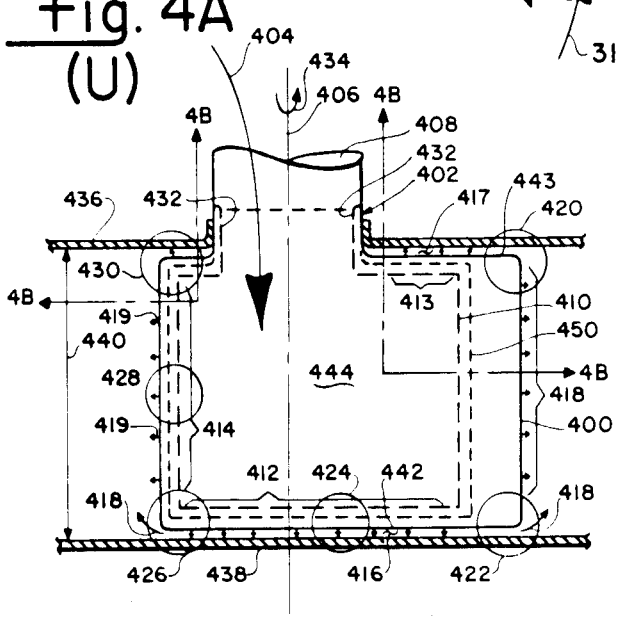

(U)

(U)

(C)

(C)

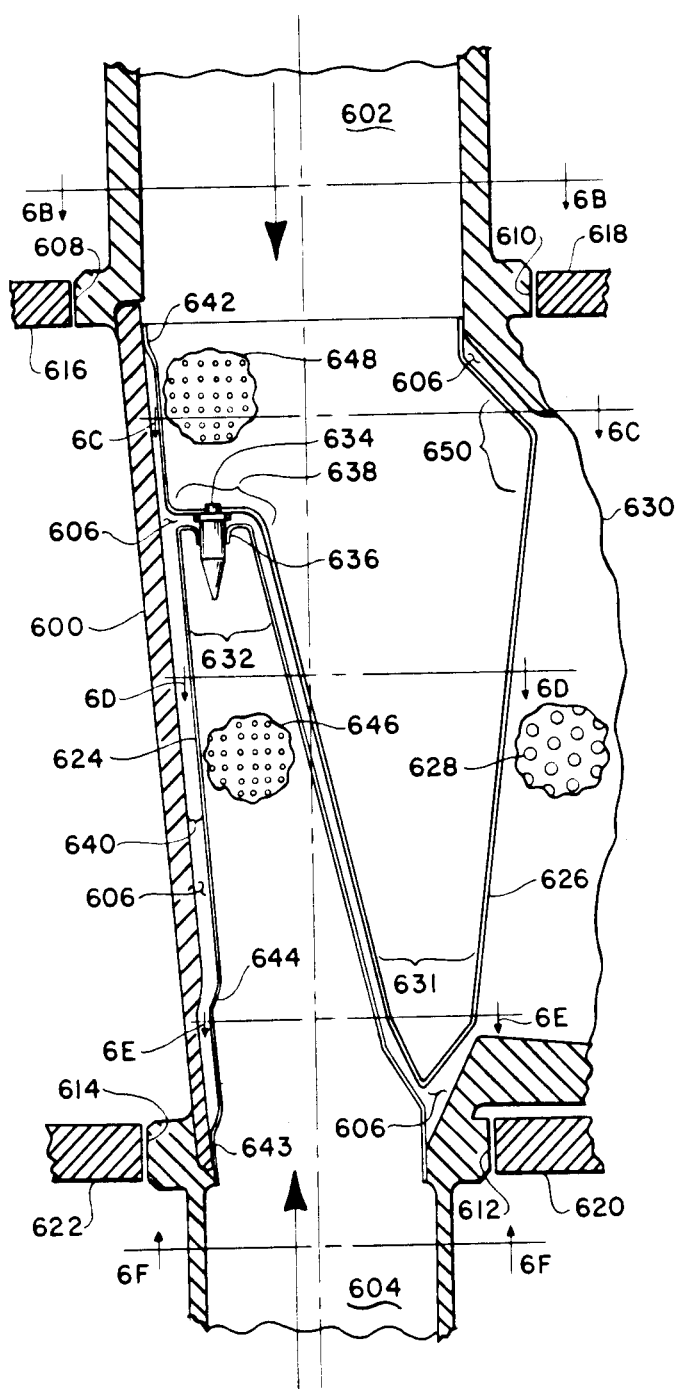
Fig. 6A (C)
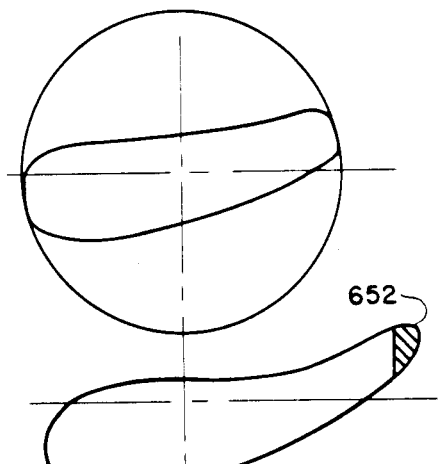
Fig. 6B (U)
Fig. 6C (U)
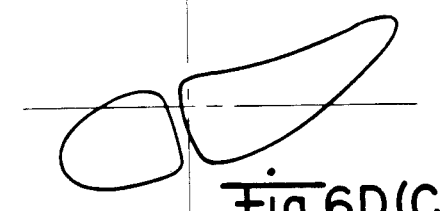
Fig. 6D (C)
Fig. 6E (C)
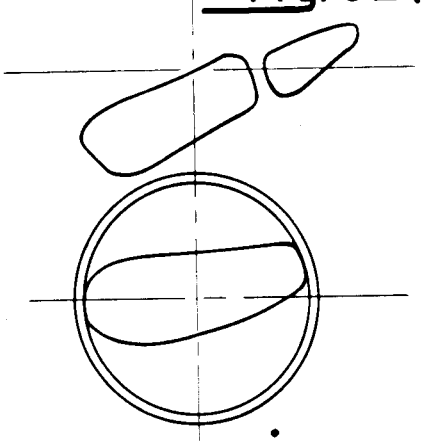
Fig. 6F (U)

VARIABLE NOZZLE AREA TURBINE VANE COOLING

RIGHTS OF THE GOVERNMENT

The invention described herein may be manufactured and used by or for the Government of the United States for all governmental purposes without the payment of any royalty.

BACKGROUND OF THE INVENTION

This invention relates to cooling arrangements for stator vanes in a variable nozzle area type double axial trunnioned stator vane for a turbomachine such as an aircraft jet engine.

Variable nozzle area hot gas-driven turbines offer attractive advantages for use in the high performance jet engines under consideration for military and future commercial jet aircraft. The ability to alter stator vane pitch angles and thereby turbine nozzle areas in the hot gas flow areas of an engine offers a degree of control over engine characteristics that is attractive in matching an engine to its operating environment -- especially in the instances of large thrust range, high altitude and high efficiency engines. The benefits of variable nozzle area turbine designs are well-known in the engine design art, but are viewed with a degree of prudent hesitation and skepticism that is prompted in part by the mechanical complexity and operating life difficulties encountered with such devices.

A mechanism is required for performing synchronized positioning of a large number of stator nozzle vanes that are disposed annularly around the circular periphery of the flow path in such a jet engine. This mechanism is required to meet extreme demands in the realms of operating temperature endurance, assembly tolerance buildup, attained vane position accuracy, and force transmitting capability in addition to the constraints on weight and physical size that are normal in the aircraft art. Mechanical tolerance buildup and linking element elasticity considerations, for example, often serve to restrict the pivot point trunnion location in a movable vane structure to the vane centroid region -- the region wherein a balancing of the combustion gas loading on opposed vane portions serves to limit the vane rotating torque developed by flowpath gases.

The engine elements such as stator vanes that are exposed to combustion gas temperatures in a jet engine turbine also require elaborate cooling in order to be viable and of a reasonable operating life when made with currently available materials. The arrangement of cooling for movable, variable area vane members therefore adds an imposing additional complexity to engine designs employing this concept. Generally, the cooling for hot gas exposed engine parts is achieved through the use of pressurized fluids such as air, disposed according to a plurality of cooling theories in carefully selected regions of the hot gas exposed engine elements. In the case of a variable nozzle area, movable stator turbine vane, the employed cooling fluid inevitably must communicate through the vane mounting trunnions in order to reach the interior of the hot gas exposed vane surfaces. The cooling attained by this approach must meet several demanding requirements, including: (1) minimal use of expensive pressurized cooling fluid—compressor discharge pressured air in the aircraft engine turbine, (2) achievement of successful cooling under a variety of environmental and load conditions, including engine operation transient conditions, (3) avoidance of operating hot spots such as would shorten element operating life in localized but structurally important portions of the vane, and of course, (4) be of limited size and acceptable physical weight.

In the hot environment of gas turbine engine elements moreover the presence of a cold spot in a cooled part—as might be produced by excessive cooling, can be as undesirable as hot spot presence, since the material located in the transition region between normal operating temperature regions and the cold spot region can be subjected to thermally induced stresses capable of inducing fracture and fatigue failures. Essentially this possibility imposes an additional requirement, a requirement for cooling uniformity in a cooled engine part such as a movable stator vane.

The cooling arrangement for movable stator vanes must also allow reasonably easy access to the vane and its components during both initial assembly and subsequent tear-down, inspection, and repair of the engine.

The combination of impingement air cooling on the internal surfaces of hot gas exposed engine elements, together with film cooling or film isolation of the element from the hot gas stream on its external surface, has therefore proven viable in the jet aircraft engine art. According to a refinement of this combination, the same air mass is desirably employed in time sequence for achieving the internal surface impingement cooling and the film cooling of the external surfaces; spent impingement cooling air being collected and directed outward of the element through carefully located film generating apertures in both stationary and movable engine vanes. Impingement cooling inherently involves the use of high-velocity air emanating from small apertures disposed at an optimum distance from the cooled surface, this air is fed from a pressurized region or plenum which is often combined with the required apertures or nozzles into a structure which is identified as a cooling baffle.

Several problems have persisted in the attainment of satisfactory cooling baffle arrangements and indeed in attaining the overall goal of satisfactory cooling in movable stator vanes—despite the presence of considerable inventive activity in this art. Among these problems has been the incurrence of cooling pressure variations within the confines of an impingement cooling baffle located internal of a movable stator vane—pressure variations which tend to limit cooling efficiency and enable hot spot buildup. Additionally, variation is experienced in the relative pressures of the air supplies received at vane trunnions—a result of cooling air pressure differences between the outward-most and inward-most located engine manifolds feeding the two trunnion ends of a stator vane element. These latter pressure variations result in a shift of the equal pressure point or match point of cooling air distribution within a movable vane to different loci and to thereby tend to effectively limit cooling air sourcing to a single trunnion of a movable vane. The movement of the match point as a result of environment changes and engine operating changes in particular, is of such complexity as to suggest against the use of double trunnion cooling supply in a movable vane. Single trunnion coolant supply is not a fully satisfactory answer for this difficulty, however, since single trunnion arrangements have been found susceptible to air supply Mach number limitation problems of an imposing magnitude.

Another movable vane cooling consideration that has been incompletely addressed in the past concerns the need for supplying pressurized air cooling fluid at usable pressures to different parts or different locations of the cooling baffle structure in order that differing gas pressures received on the vane surface be accommodated with an assurance of adequate safety margins against hot gas ingestion into the coolant supply. The movement of match point problem has been entwined with this consideration in many previous engine designs.

The patent art includes several examples of hot engine element cooling arrangements. This art includes the patent of David M. Kercher, U.S. Pat. No. 3,540,810, which concerns the cooling of a hollow turbine nozzle vane using an internal insert member that is divided into plural plenum chambers. The Kercher patent contemplates the use of a divided single insert that includes a sloping partition member which divides the insert interior into a pair of dimensionally complementary constant pressure plenums. One of these plenums is for dispensing cooling air and the other for receiving the majority of the spent cooling air for communication out of the vane via the opposite end port from the air receiving port. It is particularly notable that the Kercher apparatus relates to a fixed rather than movable vane, employs a single insert, dispenses from one half of the insert and collects from the other half, uses impingement cooling only in a forward located limited portion of the insert, and makes no provision for insert removal—indeed, shows overlapping insert ear members near the numbers 10 and 12 (in FIG. 2), suggesting away from the prospect of insert removal.

A vane and dual insert cooling arrangement is shown in the patent of Robert J. Smuland et al, U.S. Pat. No. 3,628,880, which is also concerned with an immovable engine vane member, a vane member which is cooled by a combination of impingement cooling, film cooling, and coolant flow over a number of fin internal convectors or pin fins. The Smuland et al invention contemplates the use of coolant entry from opposing ends of the vane member and exiting of spent coolant film at the trailing edge of the vane, as well as at the film generating leading edge of the cooled vane. The Smuland et al invention also contemplates the use of pressurized air delivered through a radially extreme portion of the jet engine to the rearward vane cavity, and the use of coolant fluid delivered through passages disposed at smaller engine radial locations to vane frontal cooling insert members. The absence of vane movement capability, the constant cross-sectional area of the insert members, and the use of a compartmentalized vane interior area, are particularly notable distinguishing features of the Smuland et al apparatus with respect to the arrangement of the present invention.

Another cooled engine vane arrangement is shown in the patent of Peter G. Peill, U.S. Pat. No. 4,252,501, wherein there is also disclosed an internally-cooled vane having two impingement cooling insert members which communicate from opposite ends of the cooled vane member with cooling airflow supplies. The Peill apparatus contemplates a series connection of the insert members with inter-insert airflow passing through an apertured web of the vane member. The Peill insert members are either of a closed cross-section or an open cross-section that is completed by portions of the vane structure per se. The Peill invention also teaches use of a partitioned insert member along with separate air supplies for the partition divided portions of the insert member -- one partitioned insert portion receiving once-used impingement cooling air and the other portion receiving fresh or unused cooling air from the compressor discharge. The Peill inserts are shown to be of constant cross-sectional shape throughout their length.

Another vane and vane cooling arrangement is shown in the patent of Frederick W. Steinbauer. Jr., et al, U.S. Pat. No. 4,312,624 wherein the vane interior is divided laterally in order to provide cooling at the different pressure exposed frontal and rearward sides of the vane. The Steinbauer et al patent also recites a preference for tapered cooling compartments, and indicates the possible use of two coolant supplies having different output pressure. The Steinbauer et al patent also includes a list of six prior art patents in the hollow vane cooling art, and a list of seven PTO cited patents, including several of the herein identified prior patents.

Additional vane and cooling arrangements are shown in the patents of George A. Durgin et al, U.S. Pat. No. 3,767,322, Robert G. Glenn, U.S. Pat. No. 4,135,362, and Delmer H. Landis, Jr. et al, U.S. Pat. No. 4,193,738. The Durgin et al invention concerns an airfoil shaped hollow vane which includes an internally-mounted frame member that receives pressurized cooling air for use as an impingement cooling medium and for flow through cooling paths located intermediate the frame exterior and the vane internal surface. The Glenn invention concerns a variable vane and the structure attending a variable vane in a split shaft gas turbine engine. A feature of the Glenn invention is the containment of a turbine stator structural element within the interior of the movable vane structure and the use of this structural member in supporting the inner ring member, inner annular wall and inner shroud members. The Landis, Jr. et al invention also concerns a variable area vane arrangement, and involves the use of vane interior cooling air supplied through a single trunnion of a movable vane.

Another turbine vane arrangement is shown in the patent of Dennis R. G. Laffitte et al, U.S. Pat. No. 4,403,917, which includes tapered arrangements within the vane structure and the use of pin fin rows of cast studs.

These references indicate that internal cooling of high-temperature vane members is desirable and has been achieved with some degree of success, even in movable, variable nozzle area vane structures. Nevertheless, the prior art as exemplified by these patents has been unable t resolve some of the difficulties attending the adequate cooling of all portions of a movable high-temperature vane structure.

SUMMARY OF THE INVENTION

In the present invention the pressurized air cooling fluid used with a high-temperature movable vane member is supplied along two different routes in the engine structure, passed through two trunnions of the vane, and maintained in segregated relationship within a pair of impingement cooling baffle members until accomplishment of the impingement cooling function. Controlled cross-sectional areas and cooling fluid pressure recovery are accomplished within the impingement cooling baffle members and the spent impingement cooling fluid is reused as film cooling and fin cooling media in other parts of the movable vane structure. The impingement cooling baffles are arranged in cooperating complementary and trunnion removable shapes and are held in fixed relative positions by a baffle interconnecting arrangement.

It is therefore an object of the present invention to accomplish effective cooling over the entire extent of a movable vane member in a hot gas turbomachine.

It is another object of the invention to maintain the pressurized air cooling fluid for a dual coolant circuit movable vane member in segregated flow paths for as long as possible.

It is another object of the invention to provide vane internal cooling from two coolant sources without incurring the match point movement and hot spot generation problems common in other dual-coolant supply arrangements.

It is another object of the invention to provide a desirable shape relationship for dual-coolant supplied impingement cooling baffles used internal of a movable vane member.

It is another object of the invention to achieve maximum pressure recovery in the coolant fluid supplied to a vane impingement cooling baffle member.

It is another object of the invention to provide a convenient mounting arrangement for multiple impingement cooling baffle members within a movable vane member.

It is another object of the invention to achieve the maximum cooling benefit from a given quantity of coolant air in a plural baffle movable vane structure.

It is another object of the invention to enable convenient insertion and removal of impingement cooling baffles with respect to the interior of a movable, variable nozzle area vane member.

Additional objects and features of the invention will be understood from the following description and the accompanying drawings.

These and other objects of the invention are achieved by cooling apparatus for a jet engine variable nozzle area turbine vane having leading and trailing edges and a hollow interior region communicating via the open centers of two vane mounting trunnions located at relatively inward and outward positions along an axis radial of the engine, the apparatus including, a first impingement cooling baffle member tapered along the radial axis and received via the inward trunnion open center in the leading edge adjacent portion of the hollow interior region, a second impingement cooling baffle member tapered along the engine radial axis and received via the output trunnion open center in opposed taper overlapping relationship with the first impingement cooling baffle member at the trailing edge adjacent portion of the vane hollow interior region, one of the first and second baffle members extending substantially through the radial axis distance intermediate the vane mounting trunnions and including an offset region capable of receiving an apex portion of the other baffle member therein, the first and second baffle members each including also a cylindrical portion endwise connected with the tapered portion thereof and engageable with the open center portion of the respective adjacent of the trunnions, and cooling fluid aperture means disposed over the surfaces of the vane for issuing spent impingement cooling fluid as film coolant over the vane surfaces.

BRIEF DESCRIPTION OF THE DRAWINGS

FIG. 2 shows a portion of the FIG. 1 engine in greater detail, including cooled vane apparatus in accordance with the invention.

FIG. 3 shows a cross-section of a non-movable cooled vane and an attendant cooling arrangement.

FIG. 4 including the views 4A and 4B shows a cooled vane having a single impingement cooling insert and a pressurized coolant supply circuit.

FIG. 6, including the parts 6A, 6B, 6C, 6D, 6E, and 6F shows the interior of a movable vane having two coolant supply circuits and an improved coolant dispersing arrangement.

DETAILED DESCRIPTION

Figure 1:
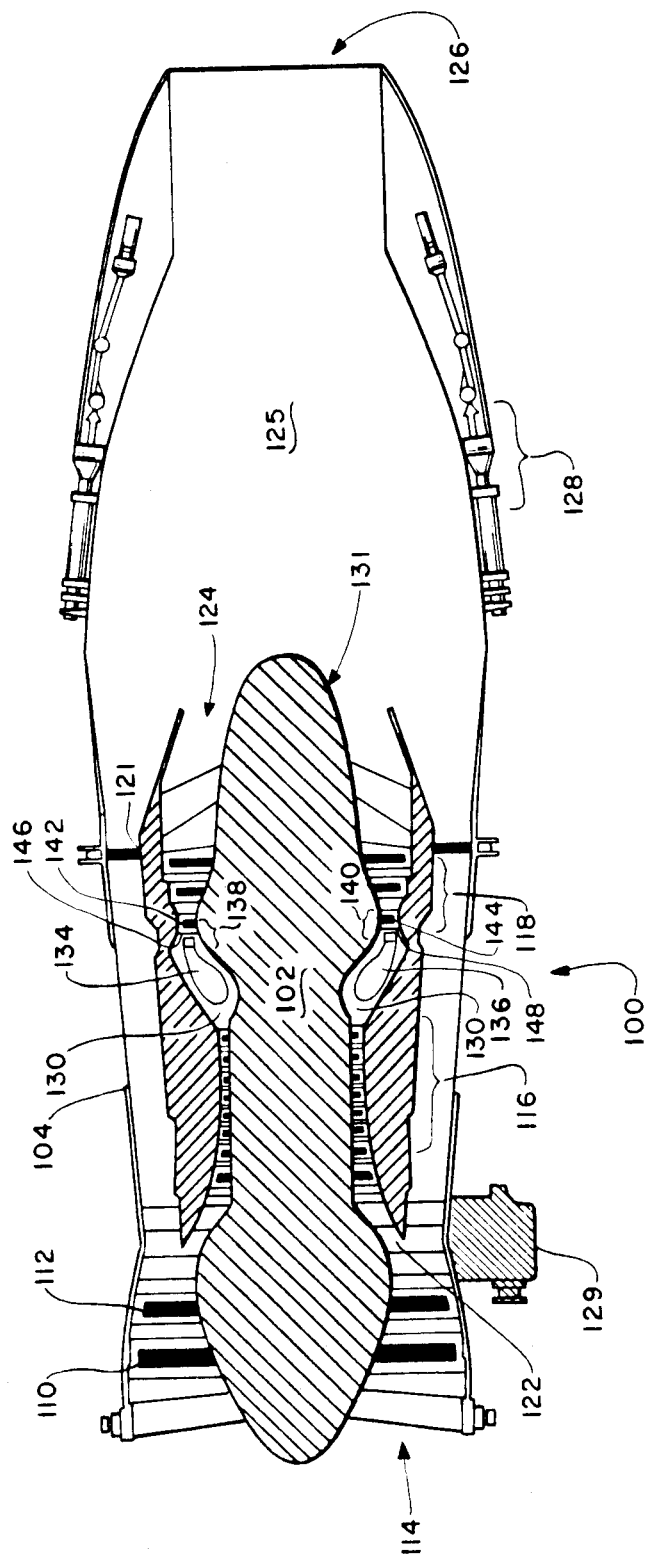
FIG. 1 shows an overall view of a fan jet aircraft engine wherein cooled movable vane members according to the present invention may be utilized.

In FIG. 1 of the drawings there is shown a cross-sectional view of a ducted turbofan type of aircraft engine, an engine of the species commonly used in present-day commercial and military aircraft. The engine assembly 100 in FIG. 1 includes a jet core engine 102, an overall housing 104, and a pair of bladed fans 110 and 112 which are driven by the core engine 102 by way of a central shaft which is not shown in FIG. 1. The core engine 102 includes a plurality of compressor stages 116, combustion chambers 134 and 136, and one or more hot gas driven bladed turbine fans 118. Individual blades of the first stage turbine fan are indicated at 142 and 144 in the FIG. 1 engine assembly, while a possible variable vane area of the engine located intermediate the plenums 130 and combustion chambers 134, 136 and the first stage blades 142 and 144 are indicated at 146 and 148 in FIG. 1. The FIG. 1 engine assembly also includes a fuel supply and control package which is indicated generally at 129, afterburner and exhaust port diameter controlling apparatus generally indicated at 128, and an inlet port 114 and exhaust port 126.

During operation of the engine assembly 100, a portion of the air captured by the inlet port 114 is received in the core engine inlet 122 and successively raised in pressure and reduced in volume by the core engine compressor stages 116. The compressed air is mixed with fuel and heated by fuel combustion occurring in the chambers 134 and 136. The resulting mixture of heated air and combustion products is passed over the variable position vanes in the areas 146 and 148, for example, to the turbine stages 118 and thence into the core engine rear aperture area 124 and into the plenum 125. This mixture is subsequently exhausted along with bypass air from the fans 110 and 112 through the exhaust port 126. The portion of the inlet air received through the inlet port 114, but not captured by the core engine 102 bypasses around the core engine 102 in an annular space which surrounds the core engine. The mixture of this annular space air and the core engine combustion products of course provides a high-velocity thrust-producing stream from the port 126.

In the regions indicated at 138 and 140 of the FIG. 1 engine assembly, the region wherein hot combustion gases pass over a vane stator structure and engage the first stage turbine blades 142 and 144, operating temperatures are desirably maintained at the most elevated levels feasible in view of the available engine element fabrication materials. High temperatures are desirable in this region of an engine in order to achieve the greatest possible thermodynamic efficiency from the engine assembly. The allowable operating temperature of the nickel and cobalt alloy materials available for use in the regions 138 and 140 of the FIG. 1 engine assembly is therefore a major theoretical limiting factor in determining the overall efficiency of the FIG. 1 engine assembly. Efforts to increase these operating temperatures have resulted in the use of sophisticated cooling of the engine elements located in the high-temperature regions 138 and 14 in order that the employed materials be capable of withstanding continuous immersion in gases exceeding the temperature of the material operating limits. The aforementioned combinations of impingement cooling on the reverse side of a high-temperature exposed vane element and film cooling or film isolation on the hot gas exposed side of the vane element is therefore especially desirable for use in vanes for the high-temperature engine regions 138 and 140.

FIG. 2 of the drawings shows a representation of the region 138, together with the plenum 130, the chamber 134, the vane 146 and blade 142 in greater detail, along with some of the quantitative considerations attending their design and operation. In FIG. 2, air is received at engine compressor discharge pressure as indicated at 210 in the plenum 130, and is shown to divide into a plurality of paths or circuits as indicated at 204, 206, and 208 for passage through the combustion region of the engine. Compressor discharge pressure (CDP) air along the path 206 enters the combustion chamber or combustor 134 by way of the aperture 224, where mixing with vaporized fuel and ignition occur. The mixture of hot gas combustion products and any residual air from the path 206 pass through the combustor exhaust aperture 226 for engagement or deflection by the stator vane 146 and subsequent kinematic engagement with the first stage turbine blade 142 and thus the delivering of mechanical energy to the turbine rotor 218.

Compressor discharge pressure air is also supplied to the annular region surrounding the combustor 134, the region identified by the spaces 200 and 202 along the paths 204 and 208 in FIG. 2. Air flowing along the paths 204 and 208 over the exterior surfaces of the combustor 134 serves to both cool the combustor surfaces, and by way of the paths 220 and 222, to also cool the stator vane 146. Additional details concerning arrangement of the combustor 134 and the cooling of combustor surfaces are disclosed in a copending patent application in the name of James S. Kelm, Ser. No. 06/385,960, filed 7 June 1982, which is hereby incorporated by reference herein.

A detailed consideration of FIG. 2 illustrates that CDP coolant air after traveling through the space 202 along the paths 208 and 220 must necessarily be of sufficient pressure as to emerge from openings in the gas stagnation region of the frontal portion 214 of the vane 146 despite the presence of high-temperature combustion products emerging from the aperture 226 along the path 228—if successful cooling of the vane 146 is to be obtained. Similarly, CDP air in the space 200, air traveling along the path 204 and 222 which is most radially distal of the engine assembly 100, must everywhere be of greater pressure than the local ambient at the point of emergence from the vane rearward portion 216 of successful cooling by this air is to be achieved. These pressure relationships must of course maintain despote flow loss of pressure in the spaces 200 and 202. In practice, the pressures allowing coolant emergence from the vane frontal and rearward portions 214 and 216 are greater than the vane external pressures by only small relative amounts. These small coolant driving pressures of course, necessitate careful maintenance or conservation of coolant pressures within the spaces 200 and 202 and especially within the vane 146 in order to achieve successful vane cooling under the contemplated variety of engine operating conditions. The maintenance or conservation or recovery of coolant pressure within the vane 146 is therefore a paramount consideration in the arrangement of vane interior structure and in the distribution of coolant flow within the vane.

Limited vane coolant driving pressure is also a consideration of influence in the FIG. 2 engine aspects wherein coolant traveling along the radially distal or extreme engine axial path 204 and 222 is supplied to the rearward or aft portions of the vane 146, while coolant traveling in the space 202 in a more inward located engine axial path is supplied to the vane frontal portion 214. In practice, it is found that greater pressure is sustained along the radially innermost path 208 and 220 than in the extreme or radially distal path 204 and 222. Since the hot combustion gas pressures occurring at the vane frontal portion 204 are found to be larger than pressures at the aft portion 216, the presence of higher pressure along the innermost coolant path 202 and 220 is desirable in supplying the needed vane coolant with a desirable margin against hot gas ingestation.

Most currently used jet aircraft engines employ fixed position stator vanes in the region 138 shown in FIGS. 1 and 2. Fixed position vanes are of course, much simpler with respect to supplying cooling air to the airfoil as compared to having to supply this cooling air through trunnions of variable vanes. Some details of a cooling arrangement usable in such a fixed position stator vane are shown in FIG. 3 of the drawings. The FIG. 3 vane 300 is shown in cross-sectional form along with forward and aft located impingement cooling baffle members 302 and 304, and representative coolant supplies 312 and 314.

The cross-section of the vane 300 is divided into forward and aft portions by a rib 306 which is preferably arranged to extend the entire engine radial height of the vane. The rib 306 therefore supplies structural rigidity, especially rigidity against ballooning distortion of the vane surfaces and also provides division of the vane interior into two coolant fluid chambers.

Coolant fluid in the form of pressurized air is delivered from the interior of the baffles 302 and 304 through an array of impingement cooling apertures which are not shown in FIG. 3, to the rear side of the vane surfaces. The spent impingement cooling fluid is subsequently delivered to the outer surfaces of the vane 300 to act as film coolant as is indicated by the coolant flow arrows 308. As indicated at 310 and 318, film coolant apertures are located more closely at the frontal or forward portion of the vane 300, and more sparsely toward the rear parts of the vane. The apertures 316 also release spent cooling fluid in the form of trailing edge film coolant.

The use of two impingement cooling baffles and the segregated pressure chambers in the forward and aft portions of the fixed position vane 300 is of course, in keeping with the principles described for the region 138 in FIG. 2. A slightly higher pressure is, for example, supplied to the baffle 302 in accommodation of the expected greater ambient pressures at the frontal edge of the vane 300, where higher pressure and leading edge fluid stagnation are to be expected. Segregated coolant baffles are of course, useful in assuring desirable more nearly optimum distribution of cooling air in consequence of the varying distribution of ambient pressure around the vane. A single plenum chamber baffle arrangement under similar operating conditions could readily allow exchange of coolant needed in a front face portion of the vane 300 with coolant in a path along the rear face or aft portion of the vane and thereby enable destructive overheating of a coolant-starved portion of the vane.

A first glance arrangement for cooling a movable, variable nozzle area vane, is shown in FIG. 4 of the drawings, including the side or lateral view of FIG. 4A and the partial cutaway view of FIG. 4B. The vane 400 in FIG. 4 is shown at 402 to be trunnion mounted in the outer band 436 of the engine liner and to include operating clearances 416 and 417 with the inner and outer bands 436 and 438 respectively, of the engine. Hot gases from the combustor therefore approach the vane 400 in the space 440 in FIG. 4. The trunnion mounting at 402 of the vane 400 of course, allows rotational movement of the vane about the axis 406, as is indicated by the arrow 434.

In keeping with the first glance approach to cooling a trunnion mounted variable nozzle area vane, the vane 400 includes a single cooling baffle or cooling insert 410 which is fed with pressurized cooling air through the hollow interior 408 of the trunnion mounting, as indicated by the arrow 404. The insert 410 includes an inlet aperture 432 that is received in the trunnion hollow interior as can be better appreciated from the view shown in FIG. 4B. Insertion of the liner 410 into the vane internal cavity 450 is usually arranged by fabricating the vane in parts, an arrangement which is not shown in FIG. 4.

During operation of a vane arranged according to the FIG. 4 drawing, pressurized air enters the insert 410 through the hollow interior 408 of the trunnion 402, as indicated by the arrow 404 and abruptly expands to fill the insert interior plenum indicated at 444. This air emerges from the insert 410 through the impingement cooling apertured surfaces of the insert indicated at 412, 413 and 414 in FIG. 4, and leaves the vane interior as film cooling air as indicated at 418 and 419.

Several practical problems are encountered with a cooling arrangement of the FIG. 4 illustrated type in practice. Most of these problems arise from cooling fluid pressure variations and most of these pressure variations in turn arise from the necessity of feeding pressurized coolant fluid through the relatively small cross-sectional area of the trunnion interior 408. An important aspect of these problems resides in the fact that the dynamic head of the influxing coolant as indicated by the arrow 404 must be kept as low as possible to reduce pressure losses and to conserve recovered static pressures within the insert plenum area 444. The sudden increase in insert cross-sectional area in the plenum area 444 is counterproductive to efficient recovery of static coolant driving pressure within the insert plenum. The abrupt expansion of the pressurized cooling fluid in the plenum 444 also results in undesirable variations in the coolant air pressure at different points within the insert 410.

This abrupt expansion and the attending cooling fluid pressure change results in a plurality of vane cooling problems, including the generation of vane-endangering hot spots, especially in the circled regions 420, 422, 424, 426, 428, and 430 in the vane 400. Inadequate cooling in these circled regions of the vane 400, can of course allow heavy oxidation and burnthrough of the vane structure.

Additional results of this abrupt expansion and inadequate cooling pressure include burnout of the vane top and bottom plates, the vane portion indicated at 442 and 443 in FIG. 4, and leading edge backflow problems wherein the coolant pressure excess in some vane locations along the leading edge becomes negative with respect to the external hot combustion gas pressure. With this negative pressure difference, of course, combustion gases are allowed to enter the vane cavity 450 and produce overheating at the point of entry and possibly at other points.

The relationship between pressure and velocity in a moving stream of compressible fluid is established in the fluid dynamics art and is found to adequately explain pressure variations found in the plenum area 444 of the insert 410. Generally cooling air pressure losses are proportional to the dynamic pressure head of the entering air 408 and are predicted by the mathematical relationship Pressure loss $= C_D [\frac{1}{2} g \rho (w/A)^2]$ where $C_D$ is the dimensionless proportionality or loss factor A is the flow area w is the flow rate g is the compression factor in Newton's low of motion $\rho$ is the air density and the bracketed quantity is the dynamic pressure head.

The severity of the abrupt expansion occurring in the plenum 444 is in principle comprehensible from the relative cross-sectional areas of the narrowest opening experienced by the cooling fluid in passing through the trunnion hollow interior 408, the area 454 in FIG. 4B, to the cross-sectional area of the cooling insert plenum, the area indicated at 444 in FIG. 4B. Clearly, a significant decrease in cooling fluid pressure is to be expected as a result of the abrupt expansion from limited area high-velocity flow at 454 to the large area low flow at 444.

Figure 5:
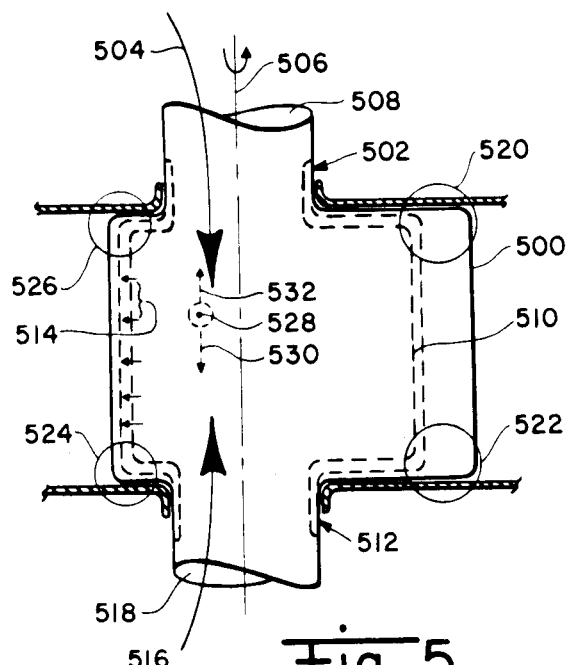
FIG. 5 shows a movable vane arrangement having dual coolant supply circuits.

An improved cooling arrangement for a movable position, variable nozzle area stator vane is shown in FIG. 5 of the drawings. The FIG. 5 movable vane is also trunnion mounted and is otherwise similar to the vane of FIG. 4 with the exception of the addition of a second trunnion 512 that is also centered on the axis 506 of the first trunnion 502. By way of the second trunnion 512, two paths 504 and 516 for providing pressurized cooling fluid to the insert 510 are available. It is, of course, desired that the supplying of the same air flow as required for the FIG. 4 vane through two trunnions shown in FIG. 5 will reduce pressure losses and increase the margin against hot gas ingestion into the vane and the coolant supply -- if the delivered pressures match near the mid-span of the vane. If, however, engine operating conditions cause the static pressures of the flows inside the vane cavity to match near the outer or inner flow path rather than in the mid-span region, the trunnion on the opposite side from the match point will tend to supply a major part of the total vane inlet cooling air flows.

When a single cooling insert such as the insert 510 is fed from two ends, as shown in FIG. 5, the underlying intent therefore is that the pressurized coolant entering at each end will find some number or some region of apertures in the surface 514 to which to feed coolant and that the flows from opposite ends will be of equal or some other appointed magnitude. The flows from opposite ends of the vane 500 might, for example, be predicted to create a matching point wherein the pressure and velocity resulting from the flow at each end is equal at some location such as the point 528 in FIG. 5.

Experience has shown that under the variety of operating conditions expected in a practical engine, the location of the matching point 528 can be expected to vary as is indicated by the arrows 530 and 532, or move to some other location within the insert 510. In some instances therefore the cooling fluid received from one of the paths 504 and 516 will attempt to feed the entire vane insert or a major portion thereof. This condition is especially troublesome when the coolant feed pressures in the radially distal and the radially closer spaces 200 and 202 in FIG. 2 are not well matched. Such an absence of desirable pressure matching in the spaces 200 and 202 is in reality, to be expected in most practical engine arrangements. This existence of unequal pressures and the presence of locally high coolant fluid Mach numbers, especially in the trunnion hollow interiors 508 and 518, therefore often leads to reduced static pressure within the insert 510 and starvation of some vane regions of coolant during at least transient periods of engine operation.

The difficulty of obtaining desired coolant pressures and distribution in the FIG. 5 vane arrangement can, of course, be additionally attributed to the cross-sectional area change phenomenon described in connection with FIG. 4B above. Despite the presence of two coolant entrance paths, therefore the abrupt expansion and attendant pressure loss combined with the uncertain location of the matching point 528 under all possible engine operating conditions frequently results in cooling problems in some locations of the vane 510 -- especially in locations such as the corner portions indicated in the circle 520, 522, 524, and 526. It follows then, that high-temperature burnout in the leading edge root, and leading edge tip portions of the vane 500 are common occurrences in a real-life usage of the FIG. 5 arrangement.

Difficulties with the FIG. 4 and 5 cooling arrangements therefore, may be summarized as follows: The loss of coolant pressure recovery inside the insert as a result of a high Mach number flow through the limited flow areas of a trunnion interior; The abrupt expansion of coolant fluid from trunnion area flow to cooling insert plenum area conditions; Differences in coolant pressure received from engine outer liner and inner liner coolant flow paths; Positional variations in location of the matching point between two coolant supplies; Pressure loss and pressure variations sufficient to incur coolant reverse flow or combustion gas ingestion into the coolant fluid circuit: The use of permanent ribs, webs or partitions to segregate coolant supplies inside a movable vane is undesirable for fabrication and operational reasons; An inability to supply hot spot preventing coolant under the worst case operating conditions; and The practical trunnion sizes achievable in a movable stator vane inherently limits their coolant supply to cross-sectional areas smaller than those used in fixed position stator vanes.

Figure 7:
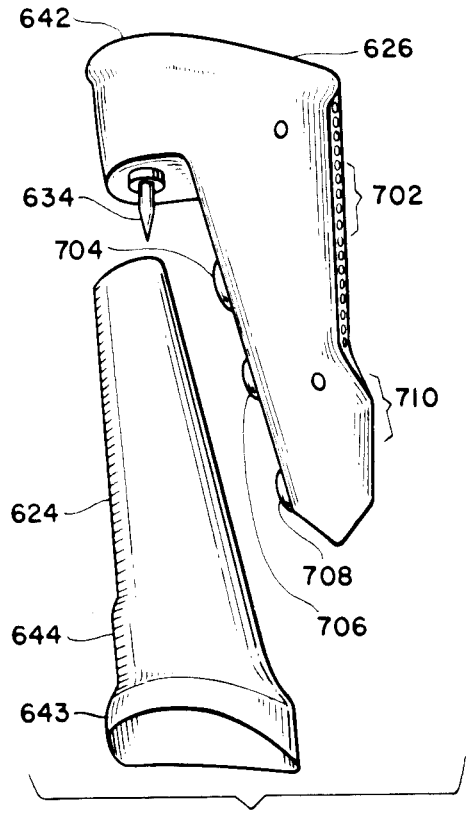
FIG. 7 shows a pair of vane inserts of the FIG. 6 illustrated type in three-dimensional perspective.

(C) A movable vane cooling arrangement capable of overcoming many of these limitations is shown in FIGS. 6, 7 and 8 of the drawings. In FIG. 6, which includes the portions 6A through 6F, a movable vane 600 is shown in a cross-sectioned view. The vane 600 includes upper and lower trunnion mounted portions 608, 610, 612, and 614 which mate with the adjacent fixed trunnion support portions, 616, 618, 620 and 622, and also includes the hollow trunnion interior areas 602 and 604 for supplying cooling air to the vane interior. The vane 600 includes an interior cavity 606 in which is received a pair of impingement cooling inserts 624 and 626, each having exterior surface portions that are covered with impingement cooling air apertures, as is indicated typically at 646 and 648. The vane 600 also includes a plurality of pin fins 628 which are shown in representative fashion in FIG. 6A and are located in the rearmost vane portion. The pin fins 628 convey vane heat to spent impingement cooling air that is exhausted from the vane rearward portion. The vane 600 also incorporates a plurality of controlled spaces, indicated at 640, of predetermined dimension that is calculated to optimize the impingement cooling effect from the pressurized air emerging from the apertures 646 and 648. The rearward extreme portion of the vane 600 is shown broken away as indicated by the break line 630 in FIG. 6A.

Several aspects of the impingement cooling inserts 624 and 626 are of unusual and especially directed characteristics. These aspects include: A double coolant supply arrangement -- the feeding of pressurized coolant air to the interior of each insert from trunnion apertures or areas 602 and 604; The use of two inserts within the vane 600; Insert tapered cross-sectional shapes of successively smaller cross-sectional area 631 and 632 and of desirable pressure recovery characteristics; Flared resilient portions of each insert 642 and 643 which are brazed or force fitted into inlet aperture of each trunnion; Gently-sloping insert side portions that are generally free of air flow impeding corners and direction changes; An offset region 638 in the upper or aft insert 626 for receiving the end portion of the lower or forward insert 624; A positioning pin 634 located in the offset region 638 for connecting the lower forward insert and upper rearward insert, 624 and 626; A positioning pin receptacle 636 received in the lower insert 624; A cross-sectional shape for the lower forward insert 624 that is capable of straight vane axial insertion and removal at any time, regardless of presence or absence of the upper aft insert 626; A shape for the upper aft insert enabling canted maneuvered positioning and insertion thereof in the absence of the lower forward insert member.

The vane 600 in FIG. 6A is preferably of a curved airfoil shape, an arrangement which causes the insert cross-section to be of somewhat more complex shape than is discernible from FIG. 6A. Samples of the insert cross-section taken at the cutting lines of different vane elevation, the cutting lines 6B, 6D, 6E, and 6F in FIG. 6A are shown in the corresponding identified figures located to the right of FIG. 6A. The preferred two inserts and the spacings between these inserts are visible in FIGS. 6B through 6F, along with the curved nature of each insert at portions of its elevation. The overhang region 650 of the top, aft insert 626 in FIG. 6A conveys cooling air aft of the trunnion bore and to regions near the outer wall of the vane 600. A portion of this overhang lying below the cutting line 6C is shown in shaded form at 652 in FIG. 6C. Shaping this transition region is critical in order to maintain the maximum pressure recovery in the coolant fluid within the insert 626 (or conversely to achieve the minimum coolant pressure loss -- as predicted by the equation described above).

Similarly, carefully selected shapes are desirable in the region of cross-section change from the trunnion bore areas 602 and 604 to the impingement cooling baffle interior to avoid undue pressure losses in the insert interior from the sudden expansion or from a flow separation phenomenon.

A notable advantage achieved with the FIG. 6A disclosed impingement cooling baffle insert arrangement is that pressure equality from the two sources of cooling air at the apertures 602 and 604 is of somewhat decreased importance so that derivation or transmission of these coolant flows in separate locations in the engine assembly is more acceptable to the maintenance of satisfactory vane cooling.

Additionally, with the insert arrangements shown in FIG. 6, the problem of shifting match points between the coolant flows entering at the trunnion areas 602 and 604 is avoided by reason of complete segregation of the upper or radially distal path supplied and the lower path supplied pressurized cooling air within differing and fully isolated plenums. The tapered and also complementary cross-sectional areas of the inserts 624 and 626 are of course, significantly improved over the prior uniform cross-section inserts with respect to recovering coolant static pressure and the avoidance of flow separation in transitions to lower velocity flows in the areas 602 and 604. Moreover, the pin fins shown in representative form at 628 in FIG. 6 are helpful in cooling the rearward portions of the vane 624 in vane areas not subject to impingement cooling.

FIG. 7 in the drawings shows an overall perspective or simulated three-dimensional view of a pair of impingement cooling baffle members made in accordance with the present invention and also generally according to the baffle arrangement shown in FIG. 6. The perspective view of FIG. 7 allows a better appreciation of the overall shape and the complementary nature of the individual insert shapes than is possible from the FIG. 6 views and also shows clearly the flared resilient regions 642 and 643 that are received in the trunnion hollow interior. FIG. 7 also shows, on the aft insert 626, the coolant apertures 702, the impingement cooling spacers 704, 706 and 708 and the shaped portion 710 which conforms to the vane interior shape and the shape of the forward insert 624. The capability for loading and removing the forward insert 624 regardless of the presence or absence of the aft insert 626 can be appreciated from the FIG. 7 view of these elements along with the necessity in most embodiments for absence of the forward insert 624 in order to load or remove the aft insert 626.

Figure 8A:
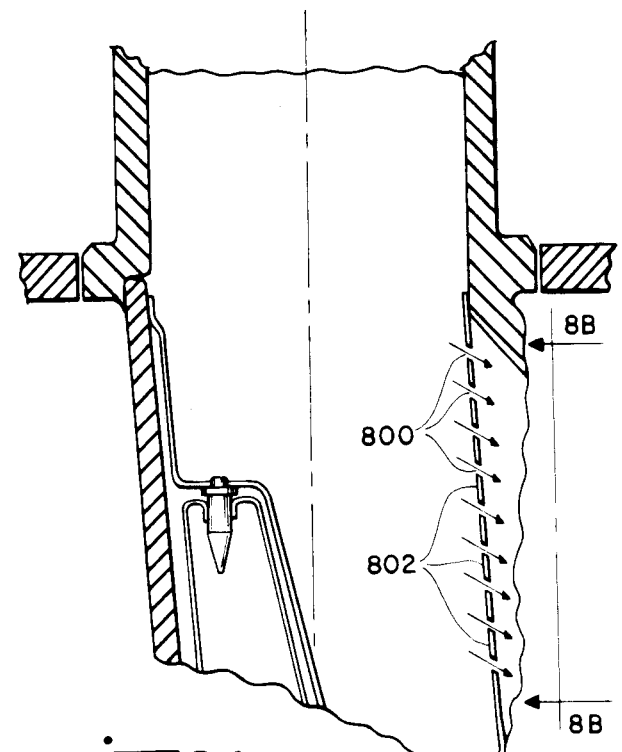
FIG. 8, including the parts 8A and 8B shows an alternate arrangement of one impingement cooling baffle in FIG. 6.
Figure 8B:
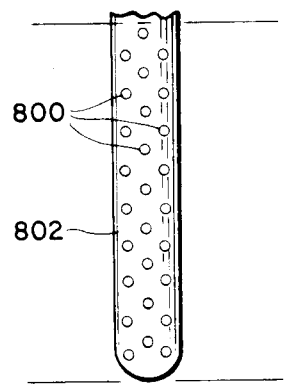

In situations where the expansion from trying to convey cooling air to the aft outer region of the insert is excessive, the alternate trailing edge arrangement of the insert indicated in FIG. 8A and 8B of the drawings can be employed to advantage, and the overhang region 650 in FIG. 6 thereby avoided. The impingement jets 800 in the FIG. 8 arrangement of the FIG. 6 apparatus delivers cooling air to the surfaces surrounding the impingement cooling baffle 802 without having the volume of the baffle member undergo the area expansion inherent in the overhang region 650 in FIG. 6.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. Variable nozzle area movable vane apparatus for an axial flow hot fluid turbomachine comprising:
   a hollow interior vane member having leading and trailing edge portions orientable partially crosswise of the annularly disposed hot fluid stream of said turbomachine, said vane member including open centered innermost and outermost trunnion portions radial axis disposed of said annular stream and located adjacent the inner and outer extremeties of said annular fluid stream;
   a first thinwalled impingement cooling baffle insert member received via a first of said open centered trunnion portions in said vane hollow interior, said first baffle insert including impingement cooling fluid apertures disposed adjacent the interior surface of said vane leading edge portion;
   a second thinwalled impingement cooling baffle insert member received via a second of said open centered trunnion portions in sand vane hollow interior, said second baffle insert including impingement cooling fluid apertures disposed adjacent the interior surface of said vane trailing edge portion;
   a first source of pressurized coolant fluid communicating via said first vane trunnion portion with the centrum of said first impingement cooling baffle insert member;
   a second source of pressurized coolant fluid communicating via said second vane trunnion portion with the centrum of said second impingement cooling baffle insert member; and
   means coupled with at least one of said vane trunnion portions for rotating said vane about said radial axis in variation of said crosswise orientation and for effecting rotational deflection of vane impinging portions of said hot fluid stream.

2. The movable vane apparatus of claim 1 wherein said turbomachine is an aircraft jet engine and said hot fluid stream is comprised of combustion product gases therein.

3. The movable vane apparatus of claim 2 wherein said first and second sources of pressurized coolant fluid include a pressurized air connection with the compressor stage of said aaircraft jet engine.

4. The movable vane apparatus of claim 1 wherein said first source of pressurized coolant fluid includes pressurized air delivered via a path disposed adjacent said inner extremity side of said annular gas stream at a first coolant pressure.

5. The movable vane apparatus of claim 4 wherein said second source of pressurized coolant fluid includes pressurized air delivered via a path disposed adjacent said outer extremity side of said annular gas stream at a second coolant pressure.

6. The movable vane apparatus of claim 5 wherein said vane leading edge portion includes an array of film cooling apertures disposed over the surface thereof.

7. The movable vane apparatus of claim 6 wherein said vane trailing edge portion includes a plurality of coolant dispersing apertures.

8. The movable vane apparatus of claim 7 further including a plurality of pin fin members disposed in the coolant flow path of said dispersing apertures.

9. The movable vane apparatus of claim 8 wherein said vane members include anairfoil cross-sectional shape.

10. The movable vane apparatus of claim 3 wherein said first and second impingement cooling baffle insert members are each of tapered overall outline, said tapered outline decreasing in cross-sectional area along said radial axis intermediate said vane trunnion portions.

11. The movable vane apparatus of claim 10 wherein said first and second insert members are of complementary cross-sectional area with respect to the cross-sectional area of said vane hollow interior at each point along said radial axis intermediate said vane trunnion portions.

12. The vane apparatus of claim 11 further including as impingement cooling flow optimized clearance space intermediate said insert member cross-sections and said vane interior cross-section at each said point along said radial axis intermediate said trunnion portions.

13. Cooling apparatus for a jet engine variable nozzle area turbine vane having leading and trailing edges and a hollow interior region communicating via the open centers of two vane mounting trunnions located at relatively inward and outward positions along an axis radial of said engine, said apparatus comprising:
 a first impingement cooling baffle member tapered along said radial axis and received via said inward trunnion open center in the leading edge adjacent portion of said hollow interior region;
 a second impingement cooling baffle member tapered along said radial axis and received via said outward trunnion open center in opposed overlapping relationship with said first impingement cooling baffle member at the trailing edge adjacent portion of said vane hollow interior region;
 one of said first and second baffle members extending substantially through the radial axis distance intermediate said vane mounting trunnions and including an offset region capable of receiving an apex portion of the other said baffle member therein;
 said first and second baffle members each including also a cylindrical portion endwise connected with said tapered portion thereof and engageable with the open center portion of the respective adjacent of said trunnions; and
 cooling fluid aperture means disposed over the surfaces of said vane for issuing spent impingement cooling fluid as film coolant over said vane surfaces.

14. The apparatus of claim 13 wherein said offset region includes a protruding pin member and wherein said apex portion includes a socket member capable of removably receiving said pin member.

15. The apparatus of claim 14 wherein said van member further includes a plurality of fin members disposed in the flow path of said cooling fluid.

16. The method of cooling hollow interiored first and second trunnion mounted variable nozzle area vanes in a jet engine comprising the steps of:
 communicating a pressurized air stream from the compressor stage of said jet engine along a first radially extreme located path in said engine to a radially extreme located set of first vane trunnions;
 transmitting a pressurized air stream from said compressor stage along a second radially smaller disposed path in said engine to a radially central located set of said second vane trunnions;
 conveying said pressurized air streams through hollow central portions of said trunnions to segregated area portions of said hollow interior regions of said vanes;
 recovering the static pressure level of said pressurized air streams within said hollow interior regions, said recovering including limiting the cross-sectional area of said air streams in said hollow interior regions to successively smaller segregated area values along the vane interior stream paths;
 issuing the pressurized air of said segregated area streams through impingement cooling apertures located adjacent the internal surfaces of said vane hollow interior regions;
 dispensing the spent impingement cooling fluid of said streams over the external surfaces of said vanes as film cooling air; and
 conveying a portion of said cooling air across heat transferring fin members in said vane hollow central portion.

17. The method of claim 16 further including the step of issuing a larger volume of said pressurized air toward the rearward portion of said vane while maintaining the coolant supply path issuing said larger volume in a non-increasing area cross-section.

* * * * *

UNITED STATES PATENT AND TRADEMARK OFFICE
CERTIFICATE OF CORRECTION

PATENT NO. : 4,798,515

DATED : January 17, 1989

INVENTOR(S) : Edward S. Hsia et al

It is certified that error appears in the above-identified patent and that said Letters Patent is hereby corrected as shown below:

```
Sheet 1, Fig.  1, delete "(U)".
Sheet 2, Fig.  2, delete "(C)".
Sheet 2, Fig.  3, delete "(U)".
Sheet 2, Fig. 4A, delete "(U)".
Sheet 2, Fig. 4B, delete "(U)".
Sheet 3, Fig.  5, delete "(U)".
Sheet 3, Fig.  7, delete "(U)".
Sheet 3, Fig. 8A, delete "(C)".
Sheet 3, Fig. 8B, delete "(C)".
Sheet 4, Fig. 6A, delete "(C)".
Sheet 4, Fig. 6B, delete "(U)".
Sheet 4, Fig. 6C, delete "(U)".
Sheet 4, Fig. 6D, delete "(C)".
Sheet 4, Fig. 6E, delete "(C)".
Sheet 4, Fig. 6F, delete "(U)".
Col  4, line 48, change "t" to ---to---.
Col  7, line 12, change "14" to ---140---.
Col 11, line 64, delete "(C)".
```

UNITED STATES PATENT AND TRADEMARK OFFICE
CERTIFICATE OF CORRECTION

PATENT NO. : 4,798,515

DATED : January 17, 1989

INVENTOR(S) : Edward S. Hsia et al

It is certified that error appears in the above-identified patent and that said Letters Patent is hereby corrected as shown below:

```
Col 12, line 54, after "6B," insert ---6C,---.
Col 14, claim 3, line 4, correct the spelling of "aircraft".
Col 15, claim 9, line 2, change "anairfoil" to
        ---an airfoil---.
Col 16, claim 15, line 1, change "van" to ---vane---.
```

Signed and Sealed this

Seventh Day of November, 1989

*Attest:*

JEFFREY M. SAMUELS

*Attesting Officer*   Acting Commissioner of Patents and Trademarks